(12) United States Patent
Wehmeier

(10) Patent No.: US 8,291,690 B1
(45) Date of Patent: Oct. 23, 2012

(54) GAS TURBINE ENGINE WITH VARIABLE AREA FAN NOZZLE POSITIONED FOR STARTING

(75) Inventor: Eric J. Wehmeier, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/367,579

(22) Filed: Feb. 7, 2012

Related U.S. Application Data

(60) Provisional application No. 61/592,672, filed on Jan. 31, 2012.

(51) Int. Cl.
*F02K 3/02* (2006.01)

(52) U.S. Cl. .......... 60/226.3; 60/771; 60/226.1; 60/778; 60/786

(58) Field of Classification Search ............ 60/778, 60/226.1, 226.2, 226.3, 770, 771, 233, 238, 60/239, 242, 786
See application file for complete search history.

(56) References Cited

U.S. PATENT DOCUMENTS

| | | | | | |
|---|---|---|---|---|---|
| 2,402,363 | A | * | 6/1946 | Bradbury | 60/242 |
| 2,798,360 | A | * | 7/1957 | Hazen et al. | 60/225 |
| 2,815,644 | A | * | 12/1957 | Jacobson | 60/238 |
| 2,840,987 | A | * | 7/1958 | Bloomberg et al. | 60/788 |
| 2,944,387 | A | * | 7/1960 | Hall et al. | 60/237 |
| 3,171,379 | A | * | 3/1965 | Schell, Jr. et al. | 114/278 |
| 3,487,482 | A | * | 1/1970 | Maljanian | 60/792 |
| 3,678,691 | A | * | 7/1972 | Shohet et al. | 60/239 |
| 3,858,390 | A | * | 1/1975 | Jansen et al. | 60/786 |
| 3,936,226 | A | * | 2/1976 | Harner et al. | 416/28 |
| 3,937,013 | A | * | 2/1976 | Aspinwall | 60/226.3 |
| 5,107,674 | A | | 4/1992 | Wibbelsman et al. | |
| 5,349,814 | A | | 9/1994 | Ciokajlo et al. | |
| 5,373,698 | A | * | 12/1994 | Taylor | 60/669 |
| 5,694,765 | A | | 12/1997 | Hield et al. | |
| 5,845,483 | A | | 12/1998 | Petrowicz | |
| 7,694,505 | B2 | | 4/2010 | Schilling | |
| 7,882,694 | B2 | * | 2/2011 | Suciu et al. | 60/226.1 |
| 2005/0166575 | A1 | * | 8/2005 | Birch et al. | 60/226.1 |
| 2009/0235638 | A1 | * | 9/2009 | Jain et al. | 60/204 |
| 2011/0041511 | A1 | * | 2/2011 | Bradbrook et al. | 60/778 |

OTHER PUBLICATIONS

Jane's Aero-Engines, Issue Seven, Copyright 2000, pp. 510-512.

* cited by examiner

*Primary Examiner* — William H Rodriguez
(74) *Attorney, Agent, or Firm* — Carlson, Gaskey & Olds, PC

(57) ABSTRACT

A gas turbine engine includes a variable inlet guide vane positioned forwardly of a low pressure compressor. The angle of the inlet guide vane is controlled at startup to increase airflow into the compressor. This is particularly useful when the gas turbine engine is being restarted while an associated aircraft is in the air, and is relied upon to increase windmill speed of the compressor and turbine rotors. A method and nozzle are also disclosed.

22 Claims, 3 Drawing Sheets

GAS TURBINE ENGINE WITH VARIABLE AREA FAN NOZZLE POSITIONED FOR STARTING

CROSS-REFERENCE TO RELATED APPLICATION

This application claims priority to U.S. Provisional Application No. 61/592,672, which was filed Jan. 31, 2012.

BACKGROUND

This application relates to a gas turbine engine having an inlet guide vane which has its position controlled to increase windmilling speed of engine components.

Gas turbine engines are known, and typically include a fan delivering air into a bypass duct outwardly of a core engine, and into a compressor in the core engine. Air in the compressor is passed downstream into a combustor section where it is mixed with fuel and ignited. Products of this combustion pass downstream over turbine rotors, driving them, and in turn drive the compressor and fan. Recently it has been proposed to include a gear reduction between a low pressure compressor and the fan, such a low pressure turbine can drive the two at distinct speeds.

A gas turbine engine as used on an aircraft must be able to start under several conditions. First, the gas turbine engine must be able to start when on the ground. A starter can be used on the ground. Second, the gas turbine engine must be able to start in the air. In the air, at lower speeds of the aircraft, the normal starter for the gas turbine engine may be utilized to begin driving the turbine/compressor rotors. However, at higher speeds the starter may not be utilized. At higher speeds so called "windmilling" is relied upon at startup. Windmilling typically occurs as the compressor and fan rotors are driven by the air being forced into the core engine, and the bypass duct, as the aircraft continues to move.

SUMMARY

In a featured embodiment, a gas turbine engine has a compressor section, a low spool, and a fan. The fan delivers air into the compressor section and into a bypass duct having a variable area nozzle. The compressor section compresses air and delivers it into a combustion section. The combustion section mixes air with fuel, igniting the fuel, and driving the products of the combustion across turbine rotors. The turbine rotors drive the low spool. A control for the gas turbine engine is programmed to position the nozzle vane at startup of the engine to increase airflow across the fan.

In another embodiment according to the foregoing embodiment, the compressor section includes a high pressure compressor and a low pressure compressor. The turbine rotors include a low turbine rotor driving the low spool and the low pressure compressor.

In another embodiment according to the foregoing embodiment, the fan is driven with the low pressure compressor by the low spool. There is a gear reduction between the fan and the low spool.

In another embodiment according to the foregoing embodiment, the control includes stored desired positions for the nozzle to provide increased airflow into the compressor at startup at various conditions.

In another embodiment according to the foregoing embodiment, the various conditions include the altitude of an aircraft carrying the gas turbine engine, and an air speed of the aircraft.

In another embodiment according to the foregoing embodiment, the conditions also include a speed of the low spool when startup is occurring.

In another embodiment according to the foregoing embodiment, the position of the nozzle is selected to increase airflow across the fan while an aircraft associated with the gas turbine engine is in the air, and to increase windmilling speed of the turbine rotors.

In another embodiment according to the foregoing embodiment, a starter is also utilized in combination with the windmilling while the aircraft is in the air to start the engine.

In another embodiment according to the foregoing embodiment, the nozzle is moved toward a full open position to increase windmilling speed.

In another embodiment according to the foregoing embodiment, a variable inlet guide vane is positioned upstream of the low pressure compressor, and the control also positions the variable inlet guide vane at start-up to increase air flow across said low pressure compressor.

In another embodiment according to the foregoing embodiment, the control includes stored desired positions for the nozzle to provide increased airflow into the compressor section at startup at various conditions.

In another embodiment according to the foregoing embodiment, the various conditions include the altitude of an aircraft carrying the gas turbine engine, and an air speed of the aircraft.

In another embodiment according to the foregoing embodiment, the conditions also include a speed of the low spool when startup is occurring.

In another embodiment according to the foregoing embodiment, the position of the nozzle is selected to increase airflow across the fan while an aircraft associated with the gas turbine engine is in the air, and to increase windmilling speed of the turbine rotors.

In another featured embodiment, a method of starting a gas turbine engine includes the steps of providing a variable area fan nozzle on a bypass duct, and moving the nozzle to a position at startup of the engine selected to increase airflow across a fan, and starting the gas turbine engine.

In another embodiment according to the foregoing embodiment, the position is selected to provide increased airflow across the fan at startup at various conditions.

In another embodiment according to the foregoing embodiment, the various conditions include the altitude of an aircraft carrying the gas turbine engine, and the airspeed of the aircraft.

In another embodiment according to the foregoing embodiment, the conditions also include a speed of a spool which drives the fan.

In another featured embodiment, a variable area nozzle has a nozzle with an actuator to change a position of the nozzle, and a control programmed to move the nozzle to a desired position at startup of an aircraft.

In another embodiment according to the foregoing embodiment, the position is selected based upon at least altitude and air speed.

These and other features may be best understood from the following drawings and specification.

DETAILED DESCRIPTION

Figure 1:
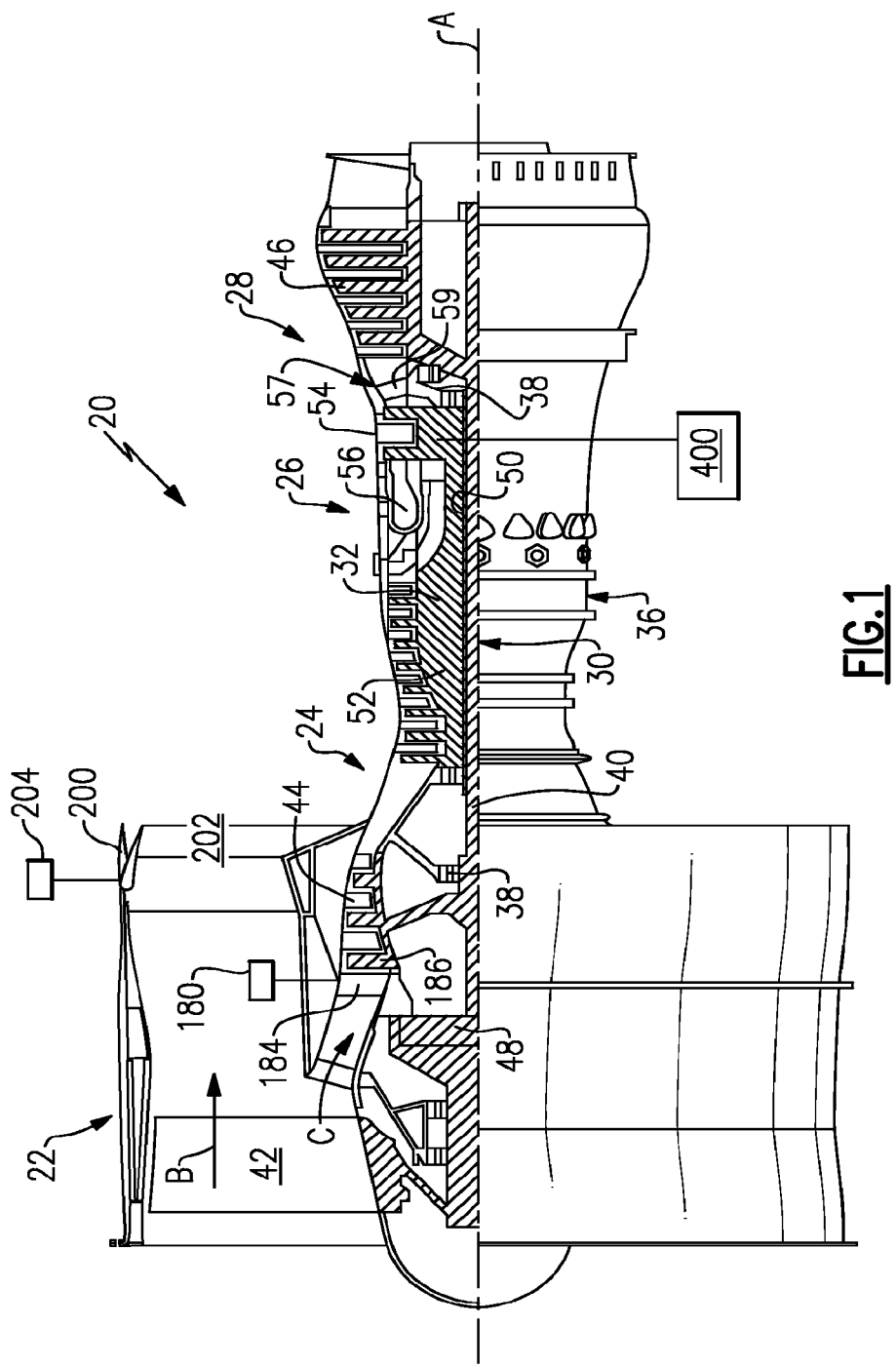
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

The gas turbine engine 20 is provided with controls and features to optimize starting.

A starter 400 (shown schematically) is typically included with a gas turbine engine, and is relied upon to begin driving the high spool when the engine is started. This will typically occur when the airplane is on the ground, and is a relatively simple process at that time.

On the other hand, there are times when the gas turbine engine is shut down while an aircraft associated with the gas turbine engine is still in the air. At lower air speeds, the starter may be utilized while the aircraft is in the air to begin driving rotation of the spool 32 to begin the restart process. Of course, once the combustion section has begun to ignite and burn the fuel, then the products of combustion will take over driving the turbine rotors and the starter may stop.

Under certain conditions, use of the starter while the aircraft is in the air is not advised or is not possible. Under those conditions, the force of air being driven into the engine core, and across the fan 42 is relied upon to drive the turbine rotors, and the compressor rotors. This process is called "windmilling."

It is desirable to increase the speed of windmilling of the high spool that occurs when it is necessary to restart the engine because higher windmill speeds drive higher airflow.

The engine is provided with equipment that is controlled to optimize to increase the ability to maximize windmilling of the high spool. Thus, an actuator 180 selectively drives a control to position a compressor inlet guide vane 184 which is just forward of the forward most low compressor rotor 186.

An angle of the vane 184 is preferably positioned to maximize the flow of air reaching the rotor 186 while the aircraft is being restarted. In flight, this would be positioning the vane 184 such that the air being forced into the core engine as the aircraft continues to move through the air with engine 20 not being powered, is maximized.

Also, the bypass airflow B may be maximized by positioning a variable fan nozzle 200. The variable fan nozzle 200 is controlled by an actuator 204, shown schematically, to move axially and control the flow area at 202. Generally, one would open the nozzle to a full open position to maximize this air flow.

Both the inlet guide vane 180 and the actuator 204 for the variable area fan nozzle 200 are generally as known. However, they have not been utilized at startup to maximize the amount of windmilling which occurs.

In general, it is desirable to position the vane 184 to maximize airflow through the core engine, and position the variable area nozzle 200 to maximize airflow across the fan 42. Airflow across the fan 42 will drive the fan to rotate, and air being forced into the core engine will cause the compressor rotor 186 to rotate.

Figure 2:
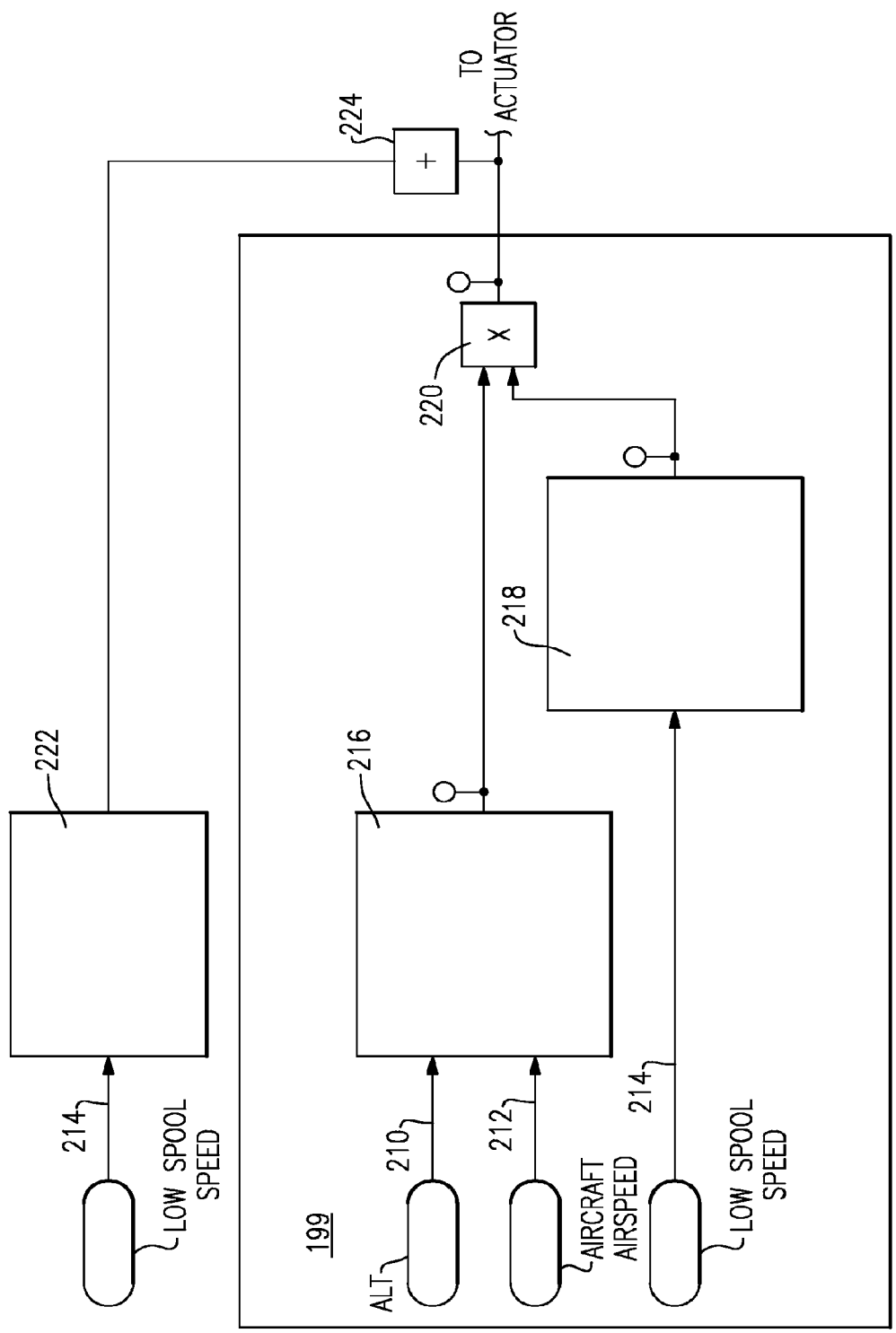
FIG. 2 is a schematic of a control logic circuit.
Figure 3:
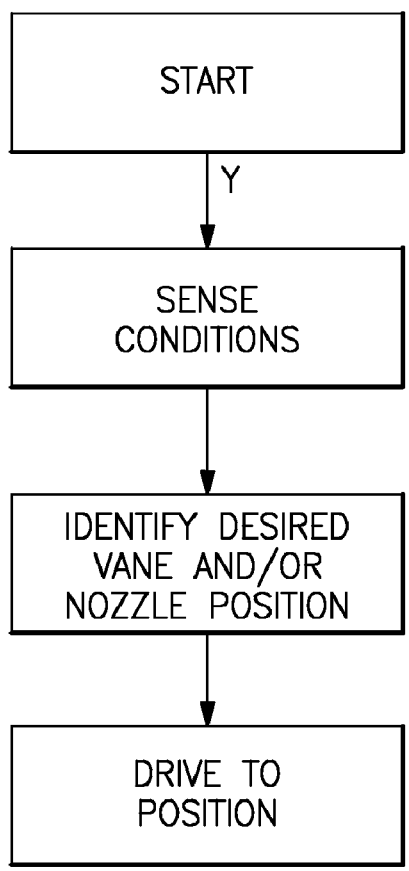
FIG. 3 is a flowchart.

Applicant has developed a control system as shown in FIG. 2 which takes in altitude signals 210, an aircraft speed signal 212, and a signal 214 which is the windmilling speed of the low spool 30.

Lookup tables are stored in control component 216, 218 and 222. Applicant has developed tables which associates particular altitudes engine speed, or Mach number, with a desired position for the vane 184, and/or the position of the nozzle 200 to maximize the airflow as discussed above. The desired positions can be developed experimentally and will vary by aircraft and engine design. While the two features may be used in combination, it is also within the scope of this application that each could be used individually without the other, where appropriate.

Control of the variable inlet guide vane is disclosed in co-pending application entitled Gas Turbine Engine With Compressor Inlet Guide Vane Positioned for Starting, filed on even date herewith, U.S. Ser. No. 13/367,742.

The signal passes downstream to a block 224, wherein additional signals come from control elements 218 and 216. Element 218 and 216 provide an adjustment to the output of element 222 based upon the low spool 30 speed altitude and aircraft airspeed.

Downstream of the block 224, a signal passes to the actuators 180 and/or 204. The FIG. 2 control can be incorporated into a FADEC 199.

Of course, if the aircraft is positioned on the ground, the altitude would be generally the same, and the Mach number would be zero. Further, the low spool speed might be zero. Even so, there would be desired positions for the vane 184 and/or nozzle 200. If the aircraft is in the air when being restarted and moving at a relatively slow Mach number, it may be possible to utilize a starter 400, shown schematically, in combination with the windmilling. However, this would all be incorporated into the lookup tables stored in component 216. Also, as mentioned above, at times the starter 400 cannot be relied upon in some circumstances. Again, this would be anticipated and relied upon at components 216, 218 and 222 or in the look-up table.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
a compressor section;
a low spool;
a fan;
said fan delivering air into said compressor section and into a bypass duct having a variable area nozzle, and said compressor section compressing air and delivering it into a combustion section;
the combustion section mixing air with fuel, igniting the fuel, and driving the products of the combustion across turbine rotors, said turbine rotors driving said low spool;
a control for said gas turbine engine, programmed to position said variable area nozzle at startup of the engine to increase airflow across said fan; and
said control including stored desired positions for said variable area nozzle to provide increased airflow into the compressor at startup at various conditions, said various conditions including the altitude of the aircraft carrying the gas turbine engine, an airspeed of the aircraft, and a speed of at least one spool associated with said gas turbine engine.

2. The engine as set forth in claim 1, wherein said compressor section includes a high pressure compressor and a low pressure compressor, and said turbine rotors include a low turbine rotor driving said low spool and said low pressure compressor.

3. The engine as set forth in claim 2, wherein said fan is driven with said low pressure compressor by said low spool, and there being a gear reduction between said fan and said low spool.

4. The engine as set forth in claim 3, wherein said control includes stored desired positions for said variable area nozzle to provide increased airflow into the compressor section at startup at various conditions.

5. The engine as set forth in claim 1, wherein the at least one spool is said low spool.

6. The engine as set forth in claim 5, wherein the position of said nozzle is selected to increase airflow across the fan while an aircraft associated with the gas turbine engine is in the air, and to increase windmilling speed of the turbine rotors.

7. The engine as set forth in claim 6, wherein a starter is also utilized in combination with the windmilling while the aircraft is in the air to start the engine.

8. The engine as set forth in claim 6, wherein said nozzle is moved toward a full open position to increase windmilling speed.

9. The engine as set forth in claim 1, said control selecting one of said stored desired conditions based upon sensed ones of said various conditions, and moving said variable area nozzle to said selected one of said stored desired positions.

10. A gas turbine engine comprising:
a compressor section;
a low spool;
a fan;
said fan delivering air into said compressor section and into a bypass duct having a variable area nozzle, and said compressor section compressing air and delivering it into a combustion section;
the combustion section mixing air with fuel, igniting the fuel, and driving the products of the combustion across turbine rotors, said turbine rotors driving said low spool;
a control for said gas turbine engine, programmed to position said nozzle at startup of the engine to increase airflow across said fan;
wherein said compressor section includes a high pressure compressor and a low pressure compressor, and said turbine rotors include a low turbine rotor driving said low spool and said low pressure compressor; and
a variable inlet guide vane is positioned upstream of said low pressure compressor, and said control also positioning said variable inlet guide vane at start-up to increase air flow across said low pressure compressor.

11. The engine as set forth in claim 10, wherein said control includes stored desired positions for said nozzle to provide increased airflow into the compressor section at startup at various conditions.

12. The engine as set forth in claim 11, wherein said various conditions include the altitude of an aircraft carrying the gas turbine engine, and an air speed of the aircraft.

13. The engine as set forth in claim 12, wherein the conditions also include a speed of the low spool when startup is occurring.

14. The engine as set forth in claim 13, wherein the position of said nozzle is selected to increase airflow across the fan while an aircraft associated with the gas turbine engine is in the air, and to increase windmilling speed of the turbine rotors.

15. A method of starting a gas turbine engine comprising the steps of:
   (a) providing a variable area fan nozzle on a bypass duct, and moving said variable area fan nozzle to a position at startup of the engine selected to increase airflow across a fan;
   (b) starting said gas turbine engine; and
   (c) storing desired positions for said variable area fan nozzle to provide increased airflow into the compressor at startup at various conditions, said various conditions including the altitude of the aircraft carrying the gas turbine engine, an airspeed of the aircraft, and a speed of at least one spool associated with said gas turbine engine.

16. The method as set forth in claim 15, wherein said one spool is a spool which drives said fan.

17. The method as set forth in claim 15, wherein a compressor section includes a high pressure compressor and a low pressure compressor, and a turbine section includes a low turbine rotor driving said low spool and said low pressure compressor.

18. The method as set forth in claim 17, wherein said position is selected to provide increased airflow across the fan at startup at various conditions.

19. The method as set forth in claim 18, wherein said various conditions include the altitude of an aircraft carrying the gas turbine engine, and the airspeed of the aircraft.

20. The method as set forth in claim 15, including the step of selecting one of said stored desired conditions based upon sensed ones of said various conditions, and moving said variable area nozzle to said selected one of said stored desired positions.

21. A variable area nozzle comprising:
   a nozzle having an actuator to change a position of the nozzle; and
   a control programmed to move the nozzle to a desired position at startup of an aircraft to be associated with the nozzle; and
   said control including stored desired positions for said variable area nozzle to provide increased airflow into the compressor at startup at various conditions, said various conditions including the altitude of the aircraft carrying the gas turbine engine, an airspeed of the aircraft, and a speed of at least one spool associated with a gas turbine engine.

22. The variable area nozzle as set forth in claim 21, wherein said control selecting one of said stored desired conditions based upon sensed ones of said various conditions, and moving said variable area nozzle to said selected one of said stored desired positions.

\* \* \* \* \*